United States Patent [19]

Klicks et al.

[11] 4,247,792
[45] Jan. 27, 1981

[54] PERMANENT MAGNET TYPE STIRRER DRIVE

[75] Inventors: Berhard Klicks, Hagen-Haspe; Jörg-Peter Körner, Hagen, both of Fed. Rep. of Germany

[73] Assignee: Uhde, GmbH, Dortmund, Fed. Rep. of Germany

[21] Appl. No.: 818,437

[22] Filed: Jul. 25, 1977

[30] Foreign Application Priority Data

Aug. 14, 1976 [DE] Fed. Rep. of Germany ....... 7625599

[51] Int. Cl.³ ............................................. H02K 5/10
[52] U.S. Cl. ..................................... 310/104; 366/173
[58] Field of Search .................. 310/103, 104, 92, 93; 366/173

[56] References Cited

U.S. PATENT DOCUMENTS

2,996,363  8/1961  Ruyak .................. 366/173 X

FOREIGN PATENT DOCUMENTS

194302  6/1965  United Kingdom .................. 310/104

Primary Examiner—Donovan F. Duggan
Attorney, Agent, or Firm—Malcolm W. Fraser

[57] ABSTRACT

A magnetic coupling for a stirrer drive in a high pressure autoclave in which the magnet shaft is in the form of a sleeve-like bush fixed on the end of the stirrer shaft. A portion of the magnet shaft serves as a carrier of segmented permanent magnets on the outside. An inner coupling part, including the magnet shaft, is covered by a hood and the outer coupling part comprises a bell equipped with permanent magnets on the inside. The bell covers the hood.

2 Claims, 2 Drawing Figures

4,247,792

PERMANENT MAGNET TYPE STIRRER DRIVE

BACKGROUND OF THE INVENTION

The invention concerns a permanent magnet type stirrer drive for a high pressure autoclave, where the inner coupling part comprises the magnet shaft equipped with permanent magnets on the outside, the inner coupling part being covered by a hood, the outer coupling part comprising the magnet bell equipped with permanent magnets on the inside, the magnet bell covering the hood.

Such a stirrer drive is known and described by German GBM Pat. No. 1,897,029. The autoclave is closed at the top by a tubular pressure housing. The stirrer shaft bearing is arranged in the housing. In order to meet the requirement of a minimum possible gap between inner and outer magnets, the annular inner magnets are segmented upon the upward stirrer shaft extension and enclosed by the tubular housing which is thin-walled by virtue of its small diameter. In this type of arrangement, the average ratio of the ring magnet diameter to the stirrer shaft diameter is smaller than, or equal to 2.5, while the ratio of the total annular magnet width to the stirrer shaft diameter is larger than 8.

The annular magnets lined up on the stirrer shaft constitute a long shaft-like magnetic coupling for industrial stirrer drives. A bearing must necessarily be provided in the tubular housing for the upper end of the stirrer shaft segmented with magnets, since the shaft would otherwise come into contact with the tubular housing as a result of a possible unbalance and vibrations.

The driving motor is arranged above the magnetic coupling. Due to the length of such a coupling type, the tubular housing will not exhibit great rigidity. In order to avoid undesirable vibration, the motor housing must be attached to the cover of the high-pressure autoclave via supports.

SUMMARY OF THE INVENTION

The object is to create a magnetic coupling for a stirrer drive in a high pressure autoclave, such that the coupling does not possess the known disadvantages.

The object is achieved by the invention in that the magnet shaft takes the form of a bush, the bush being arranged on the shaft where it serves as the shaft portion of the bearing, the part of the bush protruding to the other side of the bearing, i.e. the shaft stub, serving as carrier of the segmented permanent magnets, the ratio of the outside diameter of annular magnet to stirrer shaft diameter being larger than, or equal to 2.5, and simultaneously the ratio of the annular magnet width to the stirrer shaft diameter being smaller than, or equal to 2.0.

According to a further embodiment of the invention, the magnet shaft may take the form of a shaft stub attached to the stirrer shaft at a point outside the bearing. In another construction of the stirrer shaft, the shaft is enlarged in the area of the upper bearing to form a bush, the magnet shaft being provided with a shaft stub which is fixed in the bush on the end of the stirrer shaft. Pertinent to the invention is that the magnet shaft is of an overhung design and that there is no need for an additional bearing for the shaft at the top end of the tubular pressure housing enclosing the magnet shaft.

The magnet bell is likewise overhung on the shaft end of the driving mechanism. No additional bearing is required for the magnet bell in the tubular pressure housing. The technical progress thus achieved consists of the fact that the permanent-magnet type stirrer drive can be made much shorter, and hence considerably more compact. No special reinforcing members are thus required for mounting the driving motor above the magnetic coupling.

The provision of disk-type magnets segmented on both the magnet shaft and magnet bell permits a short construction and high stability, since the magnet shaft and magnet bell mate and one may dispense with two bearings. In addition, the short construction obviates the need to provide supports for the motor housing, such that are normally required to improve stability and to reduce vibrations.

Due to the characteristic mode of operation of such permanent-magnet couplings, i.e. either synchronous coupling or no coupling at all, and due to the fact that the permanent-magnet stirrer drives are used for autoclaves and other pressure vessels, a tachometer becomes necessary.

To monitor the rotation of the stirrer shaft, the shaft is equipped not only with the coupling magnets, but also with a multi-pole annular magnet for speed indication. The rotating magnetic field induces a voltage in an external stationary induction coil, the voltage causing a deflection on the rpm scale of a moving coil meter or being amplified and used for control and/or alarm purposes. This ensures a fully adequate operating safety for chemical reactions, including such that are difficult to control.

DETAIL DESCRIPTION OF PREFERRED EMBODIMENTS

Figure 1:
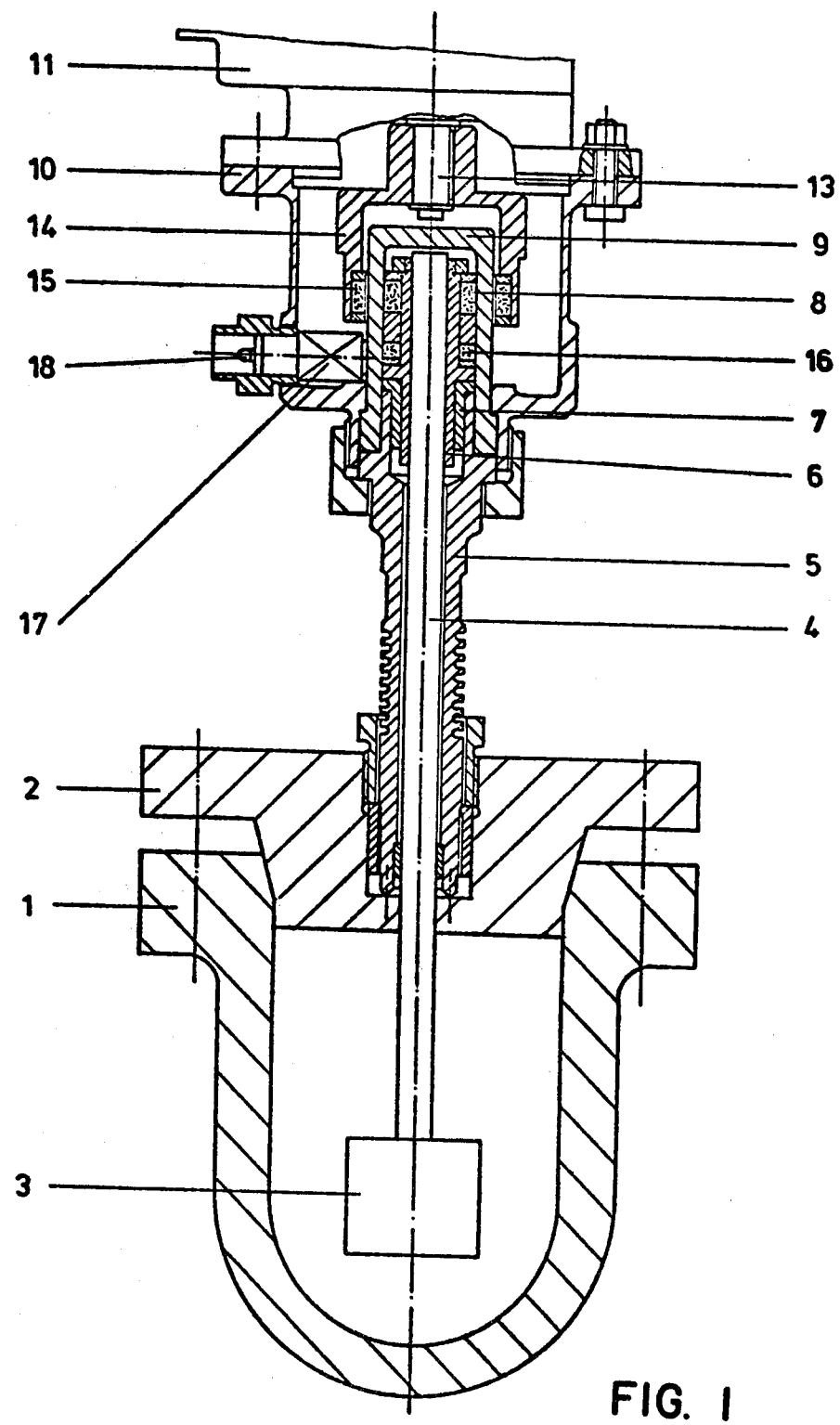
FIG. 1 is a vertical sectional elevation of the permanent magnet stirrer drive.

The contents of a high pressure autoclave 1 with its cover 2 are mixed by means of a stirrer 3. A stirrer shaft 4 with the stirrer 3 at its lower end extends through the cover and is borne by a bearing in a pressure tube 5. At its top end, the stirrer shaft 4 carries a sleeve-like magnet shaft 6 which encloses and is fixed to the stirrer shaft end in a manner similar to a bush. The lower bush-type end of the magnet shaft 6 constitutes the shaft within a bearing 7.

The magnet shaft 6 is equipped at its upper end with outside segmented permanent magnets 8 and 16. A tubular pressure housing or hood 9 hermetically encloses the magnet shaft 6 so as to leave only a minimum clearance between magnet shaft and housing. The housing 9 and the pressure tube 5 are joined tightly or bolted together with the aid of a cage 10 that basically encloses the pressure housing. The cage 10 is supported by the pressure tube 5 and, in turn, supports a driving unit 11 with variable speed gear 12.

A magnet bell 14 is attached to a shaft stub 13 of the driving unit 11. The magnet bell 14 encloses the pressure housing 9 and is equipped on the inside with a ring of permanent magnets 15 at the level of the permanent magnets 8 of the magnet shaft 6.

The ratio of the outside diameter of the annular magnets 16 to the stirrer shaft diameter 4 is larger than, or equal to, 2.5, and simultaneously the ratio of the annular magnet width to the stirrer shaft diameter is smaller than, or equal to 2.0.

The shaft 6 carries tachometer magnets 16 at the level of a pick-up coil 17. These magnets 16 induce a voltage in the coil 17, whereby the voltage may be displayed by a moving-coil meter (not shown) or amplified for control and/or alarm purposes.

Figure 2:
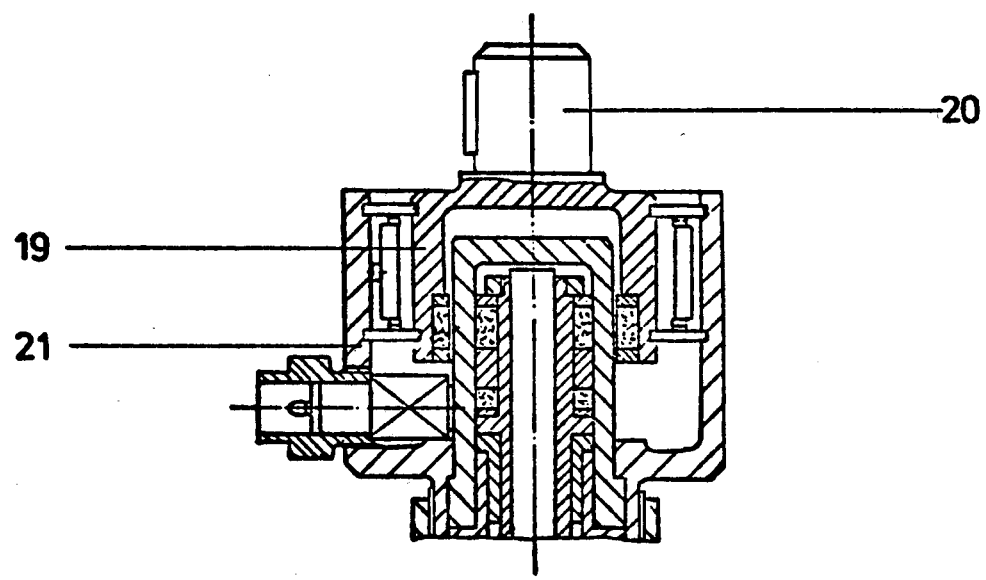
FIG. 2 is a fragmentary vertical section of the magnet bell with shaft stub.

A further embodiment of the invention, as shown on FIG. 2, provides for a shaft stub 20 on a bell 19, the shaft stub being supported by a bearing in a cage 21 in such a manner as to permit, for instance, the safe coupling of an infinitely variable speed stirrer driving gear such as is available in most laboratories, to serve as drive for the permanent magnet coupled stirrer assembly.

What we claim is:

1. Permanent magnet type stirrer drive for a high pressure autoclave comprising
    a. a stirrer shaft having a stirrer at its outer end,
    b. a high pressure tube in which said stirrer shaft rotates,
    c. a sleeve-like magnet shaft fixed to the inner end of said stirrer shaft,
    d. segmented permanent magnets on the outer side of said magnet shaft,
    e. a hood closed at its inner end and open at its outer end hermetically enclosing said magnets and magnet shaft,
    f. a sleeve bearing below said magnets and between said magnet shaft and pressure hood,
    g. a magnet bell enclosing a portion of said hood at its closed inner end,
    h. permanent magnets inside said bell at the level of said segmented magnets,
    i. a cage enclosing said bell and hood,
    j. means for securing together said cage, pressure hood and pressure tube for holding same stationary, and
    k. means for rotating said magnet bell.

2. Permanent magnet type stirrer drive for a high pressure autoclave as claimed in claim 1, in which said magnet bell rotating means comprises a stub shaft on said magnet bell, and bearing means between the outer side of said bell and said cage.

* * * * *